United States Patent [19]
Hiroshima et al.

[11] Patent Number: 5,174,013
[45] Date of Patent: Dec. 29, 1992

[54] WINDING APPARATUS AND METHOD WHICH DEFORMS THE WIRE DURING WINDING

[75] Inventors: Masayuki Hiroshima, Anjo; Masahiko Sakai, Takahama, both of Japan

[73] Assignee: Nippondenso Co., Ltd., Kariya, Japan

[21] Appl. No.: 686,883

[22] Filed: Apr. 17, 1991

Related U.S. Application Data

[63] Continuation of Ser. No. 464,665, Jan. 11, 1990, abandoned, which is a continuation-in-part of Ser. No. 207,634, Jun. 16, 1988, abandoned.

[30] Foreign Application Priority Data

Jan. 12, 1989 [JP] Japan .................................. 1-5519

[51] Int. Cl.⁵ .......................... H01F 7/06; B21F 3/04
[52] U.S. Cl. ........................... 29/605; 72/144; 72/142; 72/225; 242/25 R
[58] Field of Search ............... 72/142, 144, 146, 148, 72/224, 225, 366.2, 289; 140/92.2; 29/605; 242/25 R

[56] References Cited

U.S. PATENT DOCUMENTS

| | | | |
|---|---|---|---|
| 421,625 | 2/1890 | Sims | 72/247 X |
| 2,137,611 | 11/1938 | Hetler | 72/205 X |
| 2,242,358 | 5/1941 | Lessmann | 72/205 X |
| 2,363,684 | 11/1944 | Montgomery | 72/205 X |
| 2,380,067 | 7/1945 | Patterson | 72/247 |
| 2,559,824 | 7/1951 | Leland | 242/117 |
| 2,997,076 | 8/1961 | McVoy, Jr. | 72/148 |
| 3,150,844 | 9/1964 | LeBus | 242/117 |
| 3,194,036 | 7/1965 | Canfor et al. | 72/205 X |
| 3,272,454 | 9/1966 | Lane et al. | 242/117 |
| 3,320,788 | 5/1967 | Meier | 72/224 |
| 3,360,974 | 1/1968 | Purvance | 72/224 |
| 3,417,593 | 12/1968 | Lewis | 72/211 |
| 3,648,506 | 3/1972 | Caltagirone | 72/206 |

Primary Examiner—Lowell A. Larson
Assistant Examiner—Michael J. McKeon
Attorney, Agent, or Firm—Cushman, Darby & Cushman

[57] ABSTRACT

A winding apparatus for winding a coated wire on the drum for making a coil which is used for a stator or an alternator. A sectional shape of the wire which is introduced to the winding apparatus is circular, and the wire is deformed in order to make the sectional shape of the wire polygonal, so that the polygonal wire is fed to the bobbin in order to be wound on the bobbin. The resulting coil wound by the apparatus has an increased density.

5 Claims, 10 Drawing Sheets

WINDING APPARATUS AND METHOD WHICH DEFORMS THE WIRE DURING WINDING

This is a continuation of application Ser. No. 07/464,665, filed on Jan. 11, 1990, which was abandoned upon the filing hereof; which was a CIP of 07/207,634 filed Jun. 16, 1988 and now abandoned.

FIELD OF THE INVENTION

The present invention relates to a winding apparatus for winding a wire in order to make a coil useful, for instance, as a solenoid coil of a stator or a rator coil of an alternator.

BACKGROUND OF THE INVENTION

Figure 15:
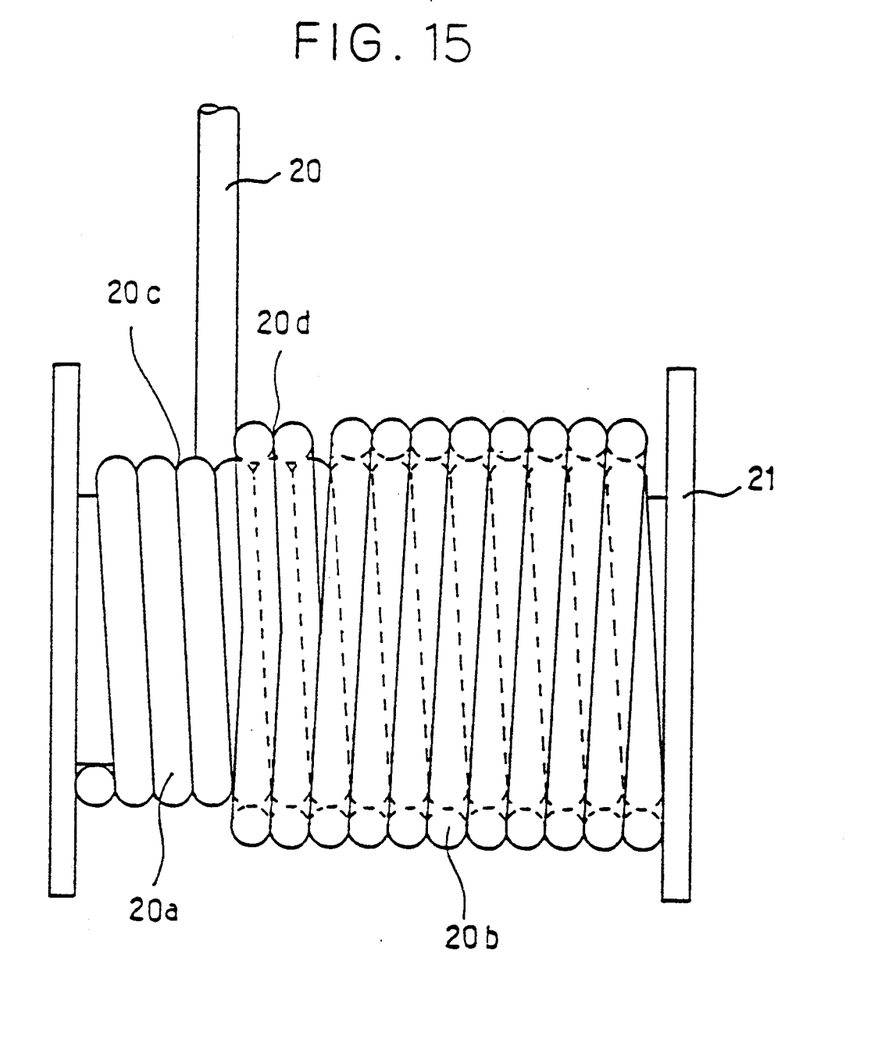
FIG. 15 is a front view of circular wire wound on a bobbin wherein the upper layer does not fit to the lower layer.

A conventional type of the winding apparatus winds the wire the sectional shape of which is circular on a bobbin 21 as shown in FIG. 15. Since the coil is required to have a high density of wires in order to decrease the volume of the equipment which uses the coil, the wire 20 is wound to be aligned. The coil shown in FIG. 15, however, cannot make the density of wire maximum even though the wire 20 is aligned in the correct order. Since the sectional shape of the wire 20 is circular, at least a certain amount of space remains between the wires adjacent to each other.

In order to reduce the void between the adjacent wires, a wire the sectional shape of which is square (square wire) may be used instead of a circular wire. According to the present inventors' study, a coil wound with square wire has the following disadvantages. Since the square wire should be uncoiled from a drum in order to be supplied to the bobbin, and since twisting of the square wire should be carefully avoided, the drum must be rotated when the square wire is uncoiled from the drum in order to avoid twisting of the square wire. Hence, such uncoiling apparatus is complex and requires much capital cost. The position of the square wire should be carefully controlled in order to align the square wire on the bobbin. Therefore, the orientation of the square wire from the uncoiler to the bobbin must be carefully controlled. Furthermore, since the end portion of the wire must be connected to the bobbin by the end of the wire being wound around the terminal of the bobbin, it is difficult to avoid twisting the wire after the end portion of the wire is wound on the terminal of the bobbin. Consequently, it is difficult to align the square wire on the bobbin. As described above, the square wire can be adapted only on the special shape of the coil.

SUMMARY OF THE INVENTION

An object of the present invention is to provide the winding apparatus for winding a wire the sectional shape of which is polygon on the bobbin. Another object of the present invention is to avoid the disadvantage that such polygonal shaped wire is twisted on the bobbin.

Further, an object of the present invention is to provide winding apparatus which can wind the wire on a bobbin in order even though the sectional shape of the wire is polygon.

DETAIL DESCRIPTION OF THE PREFERRED EMBODIMENT

Figure 1:
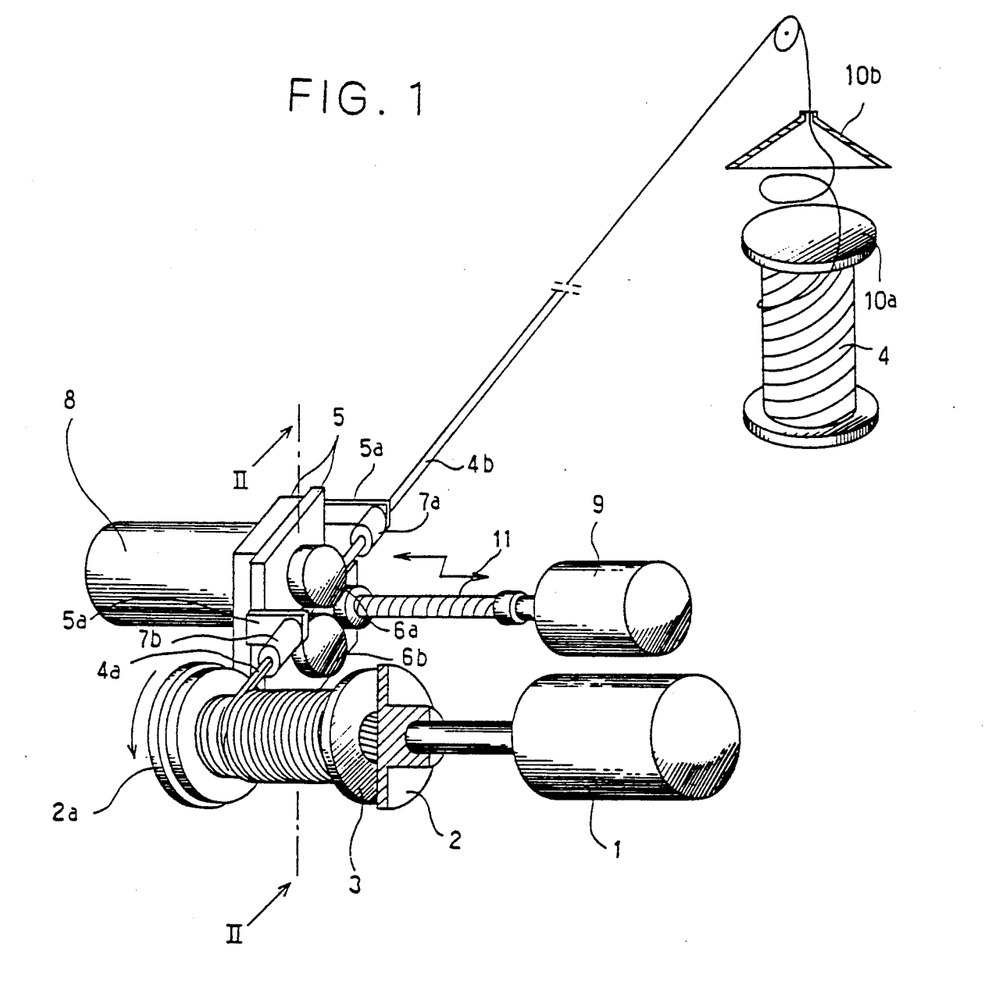
FIG. 1 is a perspective view of a winding apparatus of the first embodiment of the present invention.

The winding apparatus of the first embodiment of the present invention is explained by referring FIG. 1. Numeral 1 represents a motor which rotates a bobbin 3, numeral 2 represents a rotating tool for holding the bobbin 3. The tool 2 is connected to the motor 1 so that the tool 2 is rotated in accordance with the rotation of the motor 1. The bobbin 3 is held between the tool 2 and the fixing plate 2a so that the bobbin 3 is rotated in accordance with the rotation of the tool 2. Numeral 4 shows a wire the sectional shape of which is circular and which is wound on a drum 10. An insulating material such as polymide or polyester is coated on the wire 4 in order to maintain the electric insulation of the wire. The wire 4 of the present embodiment is used for a rotor coil of an alternator or for a solenoid coil of a magnet switch of a slator. The diameter of the wire 4 is about 1 mm.

Figure 2:
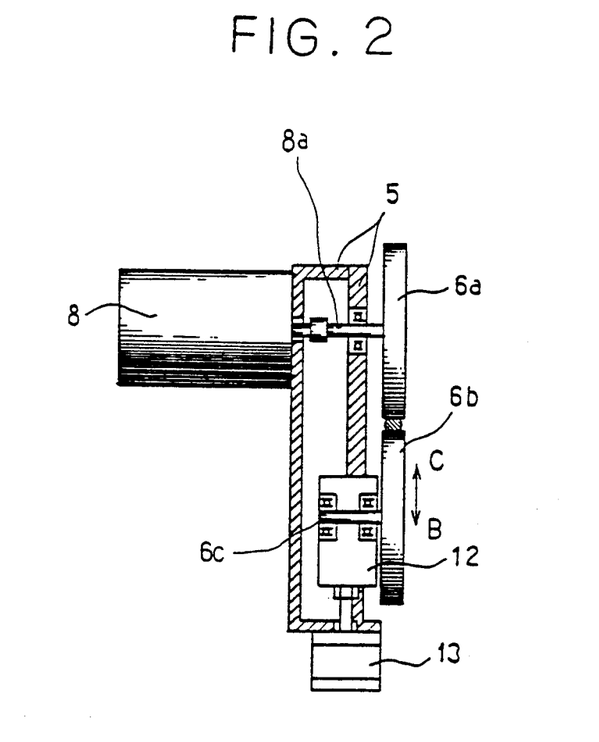
FIG. 2 is a sectional view of the deforming part of the winding apparatus shown in FIG. 1.

Numeral 5 shows a holding member. A first shaping roller 6a and a second shaping roller 6b are held on the holding member 5 (as shown in FIGS. 1 and 2). The first shaping roller is connected to a shaft 8a of a motor 8 which is connected to the holding member 5 at an opposite side from the shaping roller 6a, so that the first shaping roller 6a is rotated by the motor 8. The shaft 8a is rotatably supported by a bearing held in the holding member 5. The second shaping roller 6b is rotatably supported by a slide block 12 in such a manner that the rotating shaft 6c of the second shaping roller 6b is supported by a bearing held in the slide block 12. The slide block 12 is supported in a sliding groove formed in the holding member 5, and the sliding block 12 is connected to a sliding cylinder 13. Guide nozzles 7a and 7b are respectively connected to arms 5a of the holding member 5 in such a manner that an axis of the guide nozzles 7a and 7b locate in the center of the first and second rollers 6a and 6b. Numeral 9 shows a motor for rotating a screw member 11 to which the holding member 5 is connected so that the holding member 5 is moved in a direction parallel to the longitudinal axis of the screw member 11 in accordance with the rotation of the motor 9.

The operation of the above winding apparatus above is explained hereinafter. The bobbin 3 is held between the rotating tool 2 and the fixing plate 2a. The end portion of the wire 4 the sectional shape of which is circular and which is uncoiled from the drum 10a is conveyed toward the guide nozzle 7a through a guide 10b. The wire passed through the guide nozzle 7a is then introduced to the guide nozzle 7b through the space between the first shaping roller 6a and the second roller 6b. The slide block 12 by which the second shaping roller 6b is supported is moved downwardly (shown by arrow B in FIG. 2) by the sliding cylinder 13 to make the space between the first shaping roller 6a and the second shaping roller 6b larger than the diameter of the wire 4b. The end portion of the wire 4 is connected to a T-shaped connecting portion 3a (FIG. 3)in such a manner that the end portion of the wire 4 is connected around the connecting portion 3a. After the end portion of the circular wire is connected to the connecting portion 3a, the slide block 12 is elevated (direction of arrow C in FIG. 2) by the pressure of the sliding cylinder 13 in order to reduce the space between the first shaping roller 6a and the second shaping roller 6b for adjusting the deforming amount of the wire 4b.

Figure 3:
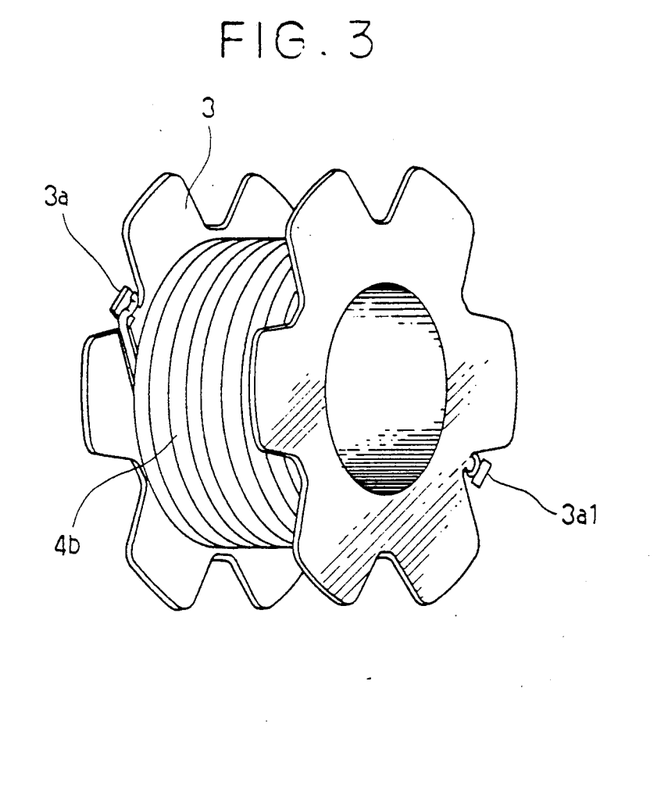
FIG. 3 is a perspective view of a bobbin on which a wire is wound by the apparatus shown in FIG. 1.
Figure 4:
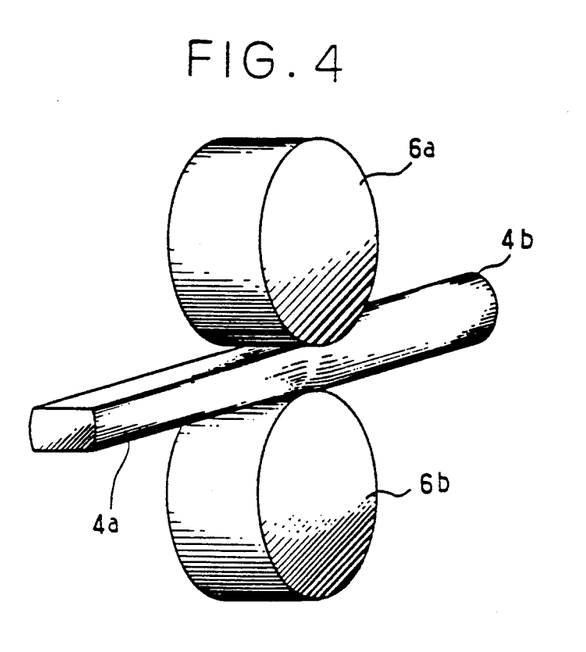
FIG. 4 is a perspective view of a wire and a couple of rollers.

After the slide block 12 is elevated, the wire 4 is wound on the outer surface of the bobbin by the rotation of the motor 1. When the wire is fed toward the bobbin 3, the wire is deformed by the first and second shaping rollers 6a and 6b as shown in FIG. 4 so that the sectional shape of the wire passed the rollers 6a and 6b becomes rectangular. The rotating torque of the first shaping roller 6a is so controlled by the rotating motor 8 that the tension of the wire fed to the bobbin 3 is maintained within the predetermined value. Since the wire from the drum 4 (circular wire 4b ) is guided by the nozzle 7a, the wire 4b is supplied to the rollers 6a and 6b steadily. The wire 7a deformed by the rollers 6a and 6b is fed toward the bobbin 3 through the guide 7b in order to be wound on the bobbin 3. Since the motor 9 is rotated while the motor 1 is rotated, the holding member 5 is transferred along the axis of the screw member 11 in such a manner that the holding member 5 moves a distance which is an equivalent to the width of the wire 4b per one rotation of the bobbin 3. After the wire 4a is completely wound on the drum 3, another end portion of the wire is connected to another T-shaped connecting portion 3a 1 in such a manner that the other end of the wire is convected around the connecting portion 3a ' (as shown in FIG. 3). The bobbin shown in FIG. 3 is used for a rotor of an automotive alternator.

Figure 5:
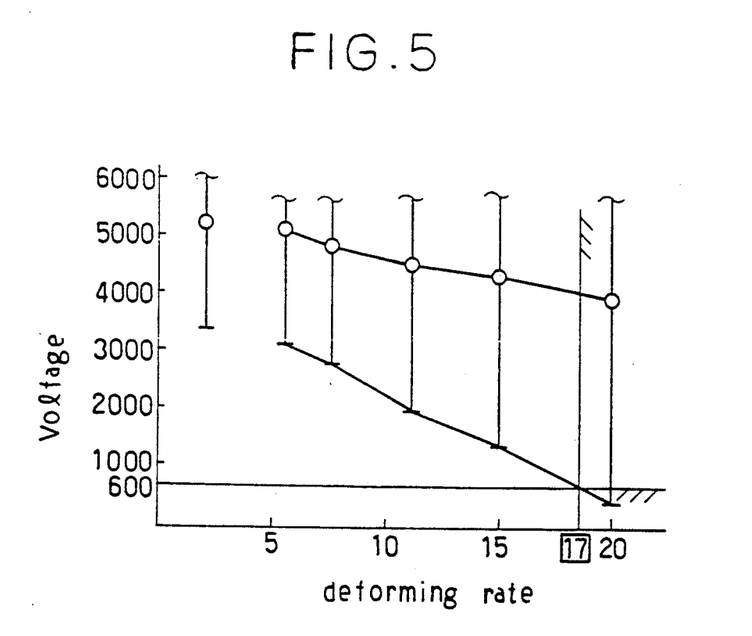
FIG. 5 shows the relationship between deforming rate and the voltage that the deformed wire can be supplied.

It is important for the winding apparatus to protect the insulating layer coated on the outer surface of the wire 4 when the wire 4 is deformed from the circular wire 4b to the square wire 4a. FIG. 5 shows the test results about the relationship between the deforming rate of the wire and the voltage that the wire can be supplied. The ordinate of FIG. 5 represents the deforming rate which is calculated as the expanded amount of the wire 4 when the wire 4 is deformed by the rollers 6a and 6b. The coordinate of FIG. 5 is the voltage. The voltage of 600 V represents as the minimum standard which is calculated as 50 times normal automotive voltage (battery voltage 12 V). The dots in FIG. 5 represents mean voltage.

As shown from FIG. 5, it is required for the wire 4 to be deformed less than the deforming rate of 17% in order to keep the voltage upper than the minimum standard voltage of 600 V. Hence, the shaping rollers 6a and 6b of the present invention so deforms the wire 4 so that the expansion rate of the wire 4 is less than 17%.

Since the winding apparatus of the present invention begins to deform the wire 4 after the end portion of the wire 4 is connected to the connecting portion 3a, namely since the sectional shape of the wire 4 is circular when the wire 4b is connected to the connecting portion 3a, twisting of the wire is well prevented even though the end portion of the wire 4 is connected to the connecting portion 3a. Therefore, the position of the square wire 4a is well controlled when the square wire 4a is wound on the bobbin 3. Furthermore, since the wire 4 is conveyed to the shaping rollers 6a and 6b is circular, the wire 4 between the drum 10a to the shaping rollers 6a and 6b does not need to be controlled twisting thereof. Consequently, the uncoiling device for uncoiling the wire 4 from the drum 10a of the present embodiment is not required to have a complex mechanism.

Figure 6:
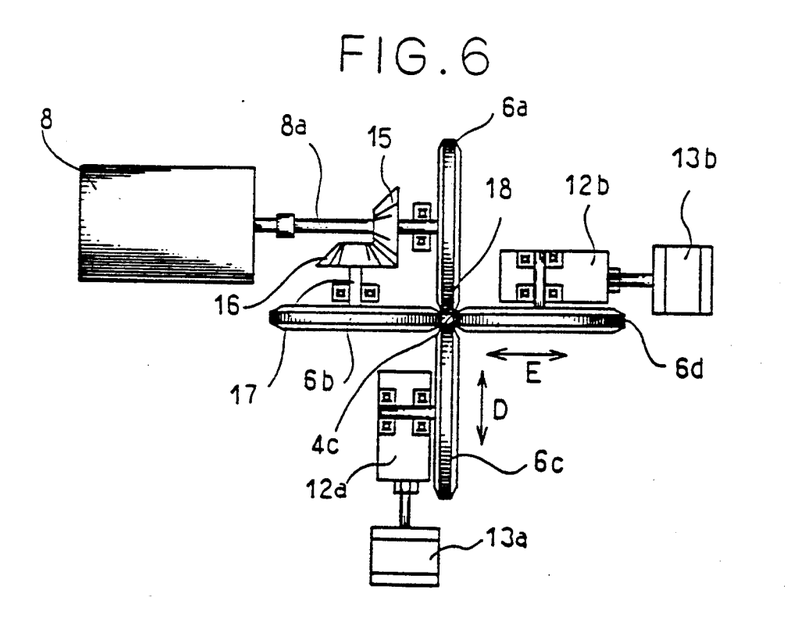
FIG. 6 is a schematic view showing the winding apparatus of the second embodiment of the present invention.
Figure 7:
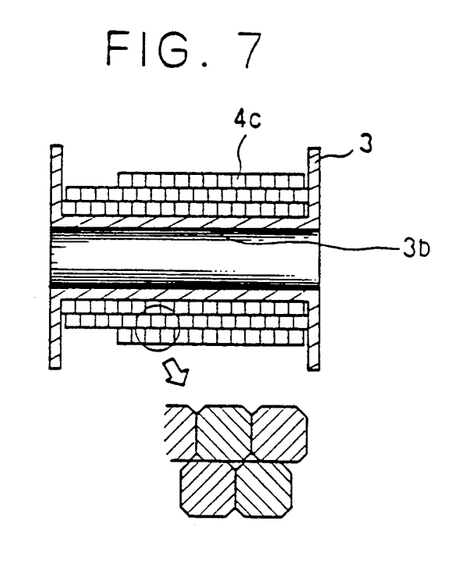
FIGS. 7 and 8 are sectional views showing the wire wound on the bobbin by the apparatus of the present invention.

FIG. 6 shows another embodiment of the winding apparatus. The first shaping roller 6a is connected at the top end of the shaft 8a of the motor 8. A first transmitting gear 15 is connected on the shaft 8a so that the gear 15 is rotated in accordance with the shaft 8a. A second transmitting gear 16 is so connected with the first transmitting gear 15 so that the rotation of the gear 15 is transmitted to the second gear 16, and the rotation of the second gear 16 is transferred to the second shaping roller 6b through the shaft 17. So that the second shaping roller 6b rotates simultaneously with the first shaping roller 6a, the second shaping roller is positioned perpendicular to the first shaping roller 6a. Numeral 12a shows a first slide block slidably connected with a first cylinder 13a so that the first sliding block 12a slides along with the line D shown in FIG. 6. A third shaping roller 6c is rotatably connected with the first sliding block 12a. The third shaping roller faces to the first shaping roller 6a so that the third shaping roller 6c and the first shaping roller 6a are aligned.

Numeral 13b shows a second sliding block which is connected to a second sliding cylinder 13b so that the second sliding block 12b can slide along with line E in FIG. 6. A fourth shaping roller 6d is rotatably connected with the second sliding block 12b, and the fourth shaping roller 6d faces the second shaping roller 6b so that the fourth shaping roller 6d and the second shaping roller 6b are aligned. Accordingly, a square space 18 is formed within the first through the fourth rollers 6a-6d as shown in FIG. 6.

Accordingly the circular wire 4b is deformed to be square while the wire 4b is transferred through the space 18. The first sliding cylinder 13a and the second sliding cylinder 13b slides the third shaping roller 6c and the fourth shaping roller 6d respectively in order not to deform the wire 4b when the end portion of the wire is connected to the connecting piece 3a. After the end portion of the wire is connected to the connecting piece 3a the wire is then deformed to be square and the square wire 4c is wound around the bobbin 3 in such a manner that the flat surface of the wire connects to the outer surface of the bobbin 3.

Since the rotating direction of the first through fourth rollers 6a-6b coincides with the drawing direction of the wire 4c caused by the motor 1, the insulating layer coated on the outer surface of the wire is well prevented from dropping off the wire 4. The motor 8 so controls the rotation of the shaping rollers 6a and 6b that a predetermined tension is caused to the wire 4c between the rollers 6a through 6b and the bobbin 3 in order to tighten the wire wound on the bobbin 3.

Figure 8:
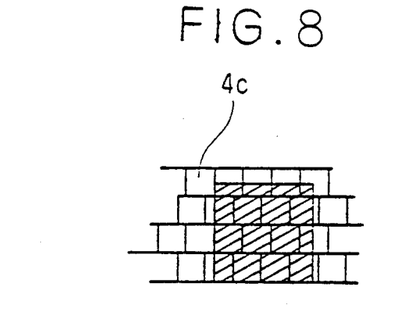
Figure 9:
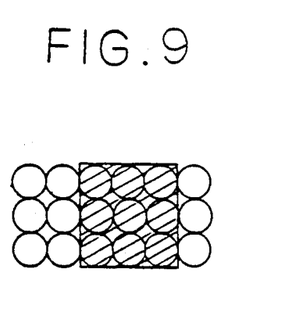
FIG. 9 is a sectional view of circular wire wound on the bobbin.

Since the square wire 4c faces the adjacent wire 4c without any gap therebetween (shown in FIG. 8), the density of the coil is improved. The density of the coil shown in FIG. 8 is 27.4% higher than that of the coil of the circular wire shown in FIG. 9. Furthermore, since no groove is formed between adjacent wires when the sectional shape of the wire is square, the wire 4c can be wound without any influence of the lower layer of wire 4c. Namely, a lead groove is formed between adjacent wires if the sectional shape of the wire is circular as shown in FIG. 15, and such lead groove should cause damage to the coil wound on the lead groove.

Figure 10:
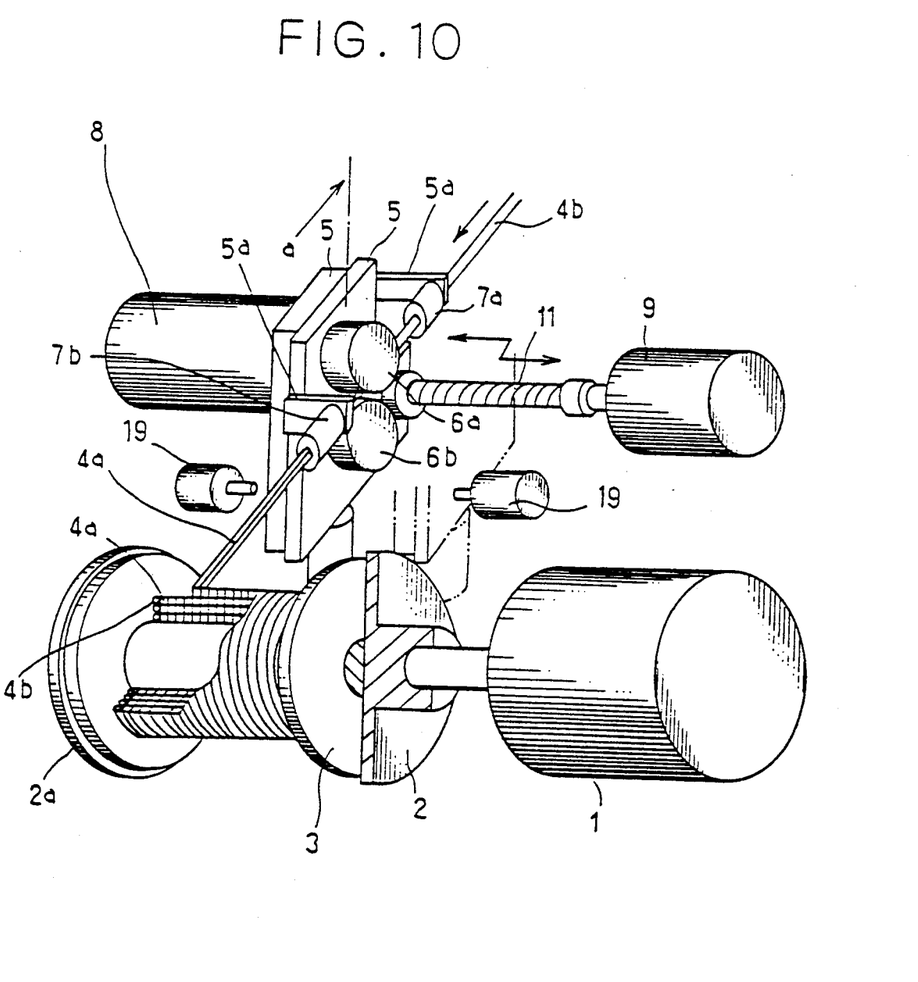
FIG. 10 is a perspective view of the winding apparatus of the present invention.

FIG. 10 shows a third embodiment of the winding apparatus of the present invention. The apparatus shown in FIG. 10 has a pair of limit switches 19. The left and right limit switches 19 are so provided that the holding member 5 actuates the left limit switch 19 when the holding member 5 moves to the predetermined left position which coincides to the left end portion of the bobbin 3. The left limit switch 19 outputs a signal to the sliding cylinder 13 (FIG. 2) for controlling the position of the sliding block 12.

The operation of the apparatus of the third embodiment is explained hereinafter. The bobbin 3 locates at the predetermined left position when the end portion of the circular wire 4b is connected to the connecting piece 3a so that the left limit switch 19 outputs a signal to the sliding cylinder 13 for sliding the second shaping roller 6b apart from the first shaping roller 6a in order to make the space between the surfaces of the first shaping roller 6a and the second shaping roller 6b expand. Therefore, the wire 4 is not deformed by the shaping rollers 6a and 6b when the left limit switch 19 senses the predetermined left position of the holding member 5.

The holding member 5 deactivates the left limit switch 19 when the drum rotates a first predetermined rotation, so that the left limit switch 19 outputs a signal to the sliding cylinder for sliding the shaping roller 6b in order to reduce the space between the first shaping roller 6a and the second shaping role 6b. Therefore, the wire 4 is deformed after the holding member 5 deactivates the left limit switch 19. The square wire 4a is, therefore, fed to the bobbin 3 in order to be wound on the bobbin 3.

The holding member 5 slides rightwardly as the winding of the wire 4 progressively rightwardly in order. After the holding member 5 moves to the predetermined right position, the holding member 5 activates the right limit switch 19. Therefore, the right limit switch 19 outputs a signal for moving the shaping roller 6b in order not to deform the wire 4. Accordingly, circular wire 4b is supplied to the bobbin at the right end position of the line of the wire 4 as shown in FIG. 10.

Figure 11:
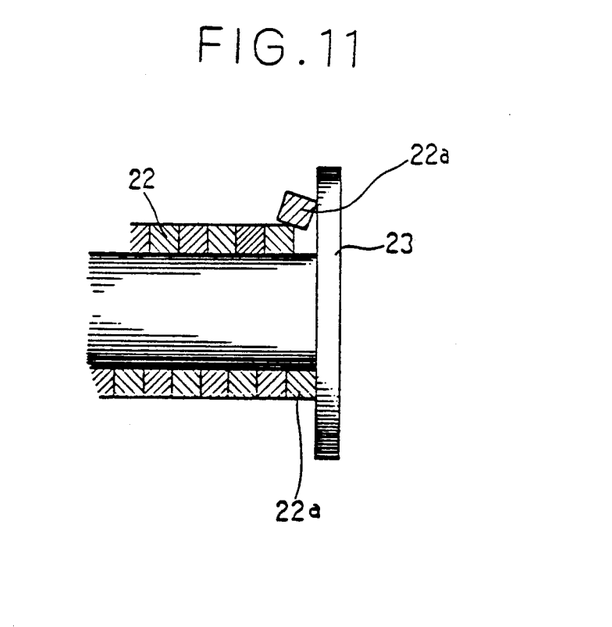
FIG. 11 is a sectional view of the wire wound on the bobbin wherein the wire located at the end of the line is out of order.

The apparatus shown in FIG. 10 ably prevents the disadvantage that the position of the square wire 22 is not held properly at the end point 22a of the line as shown in FIG. 11. It is difficult to control the positioning of square wire 22 when the wire 22 is transferred from a lower layer to be on the upper layer. The since the apparatus shown in FIG. 10 can make the sectional shape of the wire circular when the wire is positioned at the end of the line in the bobbin, the wire can be properly transferred from a lower layer to an upper layer.

Figure 12:
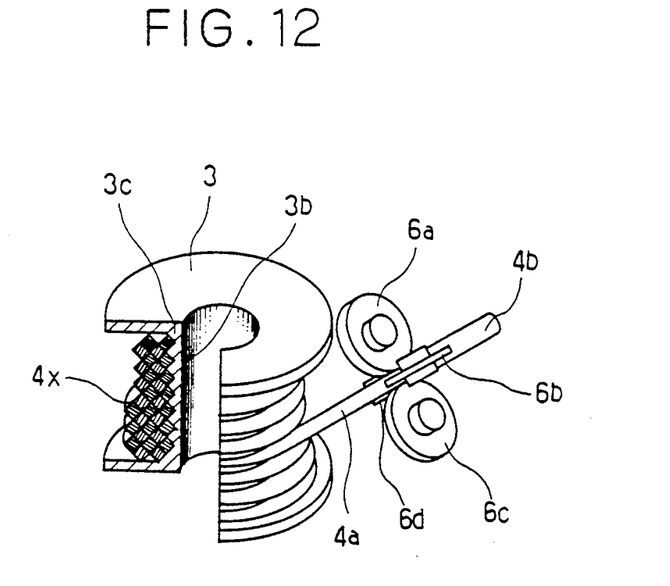
FIG. 12 is a perspective view, a part of which is sectional, of the winding apparatus according to the fourth embodiment of the present invention.

FIG. 12 shows the fourth embodiment of the winding apparatus of the present invention. The apparatus shown in FIG. 12 has the first through the fourth shaping rollers 6a-6b inclined in order to incline the square wire 4a. The bobbin 3 shown in FIG. 12 has holding grooves 3c coinciding with the sectional shape of the square wire 4a. The lead groove 4x the shape of which coincides with the sectional shape of the square wire 4a is formed between adjacent square wires 4a when the square wire 4a is wound on the bobbin 3, so that the square wire of the upper layer can be held in the lead groove 4x formed by the square wires of the lower layer. Therefore, the wire 4 is guided by the lead groove 4x when the wire is wound on the bobbin 3.

Figure 13:
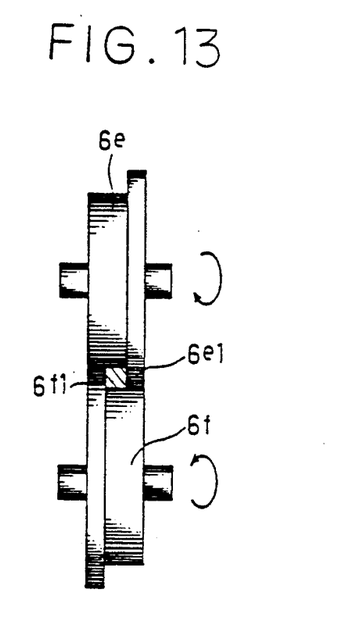
FIGS. 13 and 14 show rollers according to other embodiments of the present invention.
Figure 14:
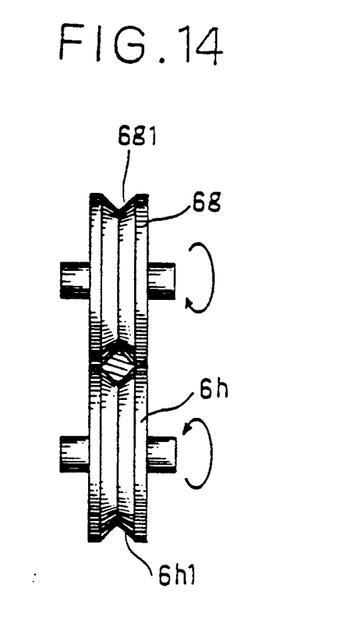

FIGS. 13 and 14 show other embodiments of the shaping rollers. The shaping rollers 6e and 6f shown in FIG. 13 has a protruding portion 6e1 and 6f1 for forming a square space within the upper surfaces of the rollers 6e and 6f and the side surfaces of the protruding portions 6e1 and 6f1. The shaping rollers 6g and 6h shown in FIG. 14 has a triangular groove 6g1 and 6h1 on the outer surface thereof and the shaping rollers 6g and 6h touched each other so that a square space is formed between the grooves 6g1 and 6h1.

Figure 16:
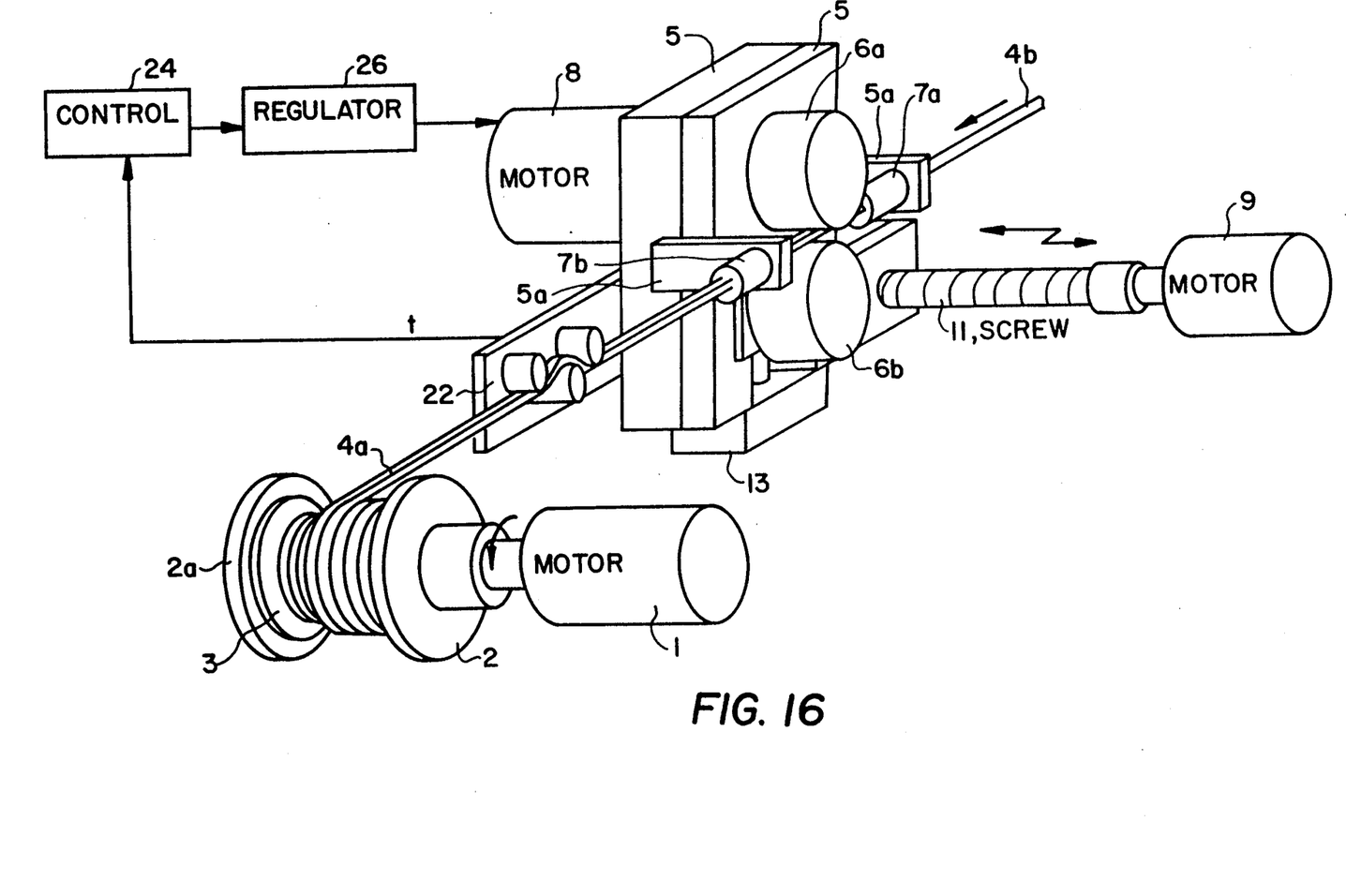
FIG. 16 is a perspective view partially schematic of a fifth embodiment of the winding apparatus of the present invention.

FIG. 16 shows the fifth embodiment of the winding apparatus of the present invention. The apparatus shown in FIG. 16 further has a tension meter 22, a control unit 24 and an electropneumatic regulator 26. The tension meter 22 detects tension acting on the wire rod 4a; and the control unit 24 receives a signal of the tension detected by the tension meter 22, compares it with a given level, and sends a signal to an electropneumatic regulator 26. This electropneumatic regulator 21 controls the turning torque of the forming roller turning motor 8 in accordance with the signal from the control unit 24.

The operation of the foregoing coil winding apparatus according to the present invention is now described. The leading end of wire rod 4b of circular shape in cross section is passed through the guide nozzle 7a, between the rollers 6a and 6b, and through the guide nozzle 7b, and is secured to the bobbin 3 after being wound therearound. Before the above step, the roller sliding cylinder 13 is operated to move down the roller 6b supported thereby (in the direction of arrow B in FIG. 2) such that the spacing between the rollers 6a and 6b becomes larger than the diameter of the round wire rod 4b.

Then, the bobbin turning motor 1 is operated to wind the wire rod 4b around the bobbin 3. At this time, the slide block 12 (in FIG. 2) is moved up by means of the roller sliding cylinder 13 to shift the roller 6b upward (in the direction of arrow C in FIG. 2) such that the spacing between the rollers 6a and 6b will result in a given degree of deformation.

Where a copper wire rod 4b of 0.995 mm in diameter, for example, is pressed to 0.75 mm to form the wire rod 4a and this wire rod is wound around the bobbin 3, a tension of 10 Kgf is imposed on the wire rod 4a between the bobbin 3 and the rollers, for example, 6a and 6b. This tension is a force acting to stretch the wire rod 4a and is imposed on the wire rod 4a after the covered wire 4b is pressed by the rollers 6a and 6b; therefore, without the tension control arrangement of the present invention, an undesirable twisting force is applied to the cover or coating of the wire rod, so that the coating is badly damaged, for example cracked open.

In view of the above, according to the present invention, as shown in FIG. 4, a torque T is applied to the roller 6a in the same direction as that of the tension F by means of the forming roller turning motor 8, so that the tension decreases. That is, the value of the forming resistance of the wire rod 4a minus the torque T becomes the tension F acting on the wire rod 4a having been formed. Therefore, the tension acting on the wire rod 4a can be varied by varying the torque T.

An example of the torque control of the forming roller turning motor 8 is as follows. That is, the tension F acting on the wire rod 4a is detected by the tension meter 22. The control unit 24 receives the tension F detected by the tension meter 22 and delivers an instruction to the electropneumatic regulator 26 to vary the air pressure being supplied to the forming roller turning motor 8 such that the tension F becomes a given level (for example, 4 Kgf).

In this way, the tension acting on the wire rod 4a is regulated, and the round wire rod 4b is continuously pressed under optimum tension, whereby a flat or rectangular wire rod 4a is formed as shown in FIG. 3. During this forming, the round wire rod 4b is passed through the guide nozzle 7a and led stably to a given position between the pair of forming rollers 6a and 6b. Then, the wire rod thus made flat or rectangular is passed through the guide nozzle 7b and led to the bobbin 3. At the same time, the traversing motor 9 is also operated, so that the whole wire rod forming section shown in FIG. 2 is moved horizontal back and forth by means of the screw member 11 in synchronization with the rotation of the bobbin 3 (i.e., the rotation of the bobbin turning motor 1) at a pitch corresponding to the width of the wire rod 4a.

Further, the tension acting on the wire rod 4a can be set arbitrarily by using an air motor as the forming roller turning motor 8 and regulating the pressure and flow rate of air being supplied to that motor. Of course, the same effect as above can be obtained by using any motor, such as a torque motor, whose output torque can be controlled.

What is claimed is:

1. A winding apparatus for winding a wire onto a bobbin, comprising:
   uncoiling means for uncoiling the wire which has a circular cross-section from the drum on which the wire is wound;
   deforming means for deforming the wire in such a manner that the cross-sectional shape of the wire is polygon;
   rotating means for rotating the bobbin to wind the wire thereon;
   first means for preventing deforming of the wire by said deforming means when the position of the wound wire is at an end portion of said bobbin, and
   second means connecting the deforming means and the rotating means for varying, per bobbin revolution, the position on the bobbin at which the wire from the deforming means is wound,
   the non-deformed wire being wound at said end portion of said bobbin and the deformed wire being wound on the bobbin so that a side surface of the deformed wire wound on said bobbin contacts with a side surface of an adjacent deformed wire.

2. A winding apparatus claimed in claim 1, wherein: said deforming means includes a pair of shaping rollers facing toward each other for forming a passing space which has a polygon sectional shape for deforming said wire into said shape.

3. A winding apparatus claimed in claim 2, wherein: said first means comprises:
   sliding means connected to one of said shaping rollers so that the passing space is varied in accordance with a movement of said sliding means,
   said sliding means being so controlled that the passing space is expanded in order not to deform the wire when the position of said wound wire is at said end portion of said bobbin.

4. A winding apparatus claimed in claim 3, further comprising:
   connecting means for connecting an end portion of the wire to a connecting piece formed on said bobbin, wherein
   said shaping rollers deforms the wire after said connecting means connects the end portion of the wires on said connecting portion.

5. Method for winding a wire which has a circular cross-section onto a bobbin, comprising:
   uncoiling the wire an outer surface of which is coated by an insulating material;
   deforming the circular cross-sectional shape of said wire into a polygon at certain times and not at other times,
   winding the deformed wire so that a side surface of the deformed wire wound on said bobbin contacts with a side surface of an adjacent deformed wire; and
   winding the non-deformed wire at the end of said bobbin when the wire winding progresses to the end of said bobbin.

* * * * *